(12) United States Patent
Simard

(10) Patent No.: US 6,382,659 B1
(45) Date of Patent: May 7, 2002

(54) LOAD DISTRIBUTING TANDEM SUSPENSION ASSEMBLY

(75) Inventor: André-Marie Simard, Baie-St-Paul (CA)

(73) Assignee: Emmanuel Simard et Fils (1983) Inc., Quebec (CA)

( * ) Notice: Subject to any disclaimer, the term of this patent is extended or adjusted under 35 U.S.C. 154(b) by 0 days.

(21) Appl. No.: 09/812,684

(22) Filed: Mar. 21, 2001

(51) Int. Cl.⁷ .............................................. B60G 5/047
(52) U.S. Cl. ...................... 280/686; 280/104; 280/676; 280/682; 280/683
(58) Field of Search ................................. 280/686, 104, 280/676, 682, 683

(56) References Cited

U.S. PATENT DOCUMENTS

| | | | |
|---|---|---|---|
| 2,772,891 A | * 12/1956 | Bonnin | 280/682 |
| 3,499,660 A | 3/1970 | Raidel | 280/104.5 |
| 3,510,149 A | 5/1970 | Raidel | 280/124 |
| 3,762,487 A | 10/1973 | Bilas | 180/24.09 |
| 3,921,999 A | 11/1975 | Masser | 280/104.5 |
| 4,132,433 A | 1/1979 | Willetts | 280/712 |
| 4,136,893 A | 1/1979 | Sweet et al. | 280/678 |
| 4,256,326 A | 3/1981 | Cantrell et al. | 280/683 |
| 4,397,478 A | 8/1983 | Jensen et al. | 280/711 |
| 4,676,523 A | 6/1987 | Rogers | 280/682 |
| 4,741,553 A | 5/1988 | Raidell, II | 280/682 |
| 4,856,812 A | 8/1989 | Stephens et al. | 280/678 |
| 4,966,387 A | 10/1990 | White, IV | 280/712 |
| 4,995,634 A | * 2/1991 | Evans | 280/686 |
| 5,234,067 A | 8/1993 | Simard | 180/24.01 |
| 5,375,871 A | 12/1994 | Mitchell et al. | 280/688 |
| 5,458,360 A | 10/1995 | Raidel, Sr. | 280/686 |
| 5,470,096 A | 11/1995 | Baxter | 280/712 |
| 5,615,906 A | 4/1997 | Raidel, Sr. | 280/686 |
| 6,062,579 A | 5/2000 | Fortier | 280/124.1 |
| 6,129,369 A | 10/2000 | Dudding | 280/124.175 |

* cited by examiner

*Primary Examiner*—Eric Culbreth
(74) *Attorney, Agent, or Firm*—McDermott, Will & Emery

(57) ABSTRACT

A load distributing tandem suspension assembly for supporting a chassis of a vehicle. Front and rear elongated spring arrangements are connected to each other through an intermediate equalizer arrangement. The front spring arrangement has a leaf spring pivotally attached between the chassis and the equalizer arm of the equalizer arrangement. The rear spring arrangement has a shorter leaf spring pivotally attached to the equalizer arm and assisted by a shock absorber attached between the rear end of the leaf spring and the chassis. A guiding device guides the rear end of the second spring element up and down with respect to the chassis in a vertical course.

19 Claims, 3 Drawing Sheets

LOAD DISTRIBUTING TANDEM SUSPENSION ASSEMBLY

FIELD OF THE INVENTION

The present invention relates to a load distributing tandem suspension assembly for supporting a chassis of a vehicle such as a truck.

BACKGROUND

Known in the art are U.S. Pat. No. 3,499,660 (Raidel), U.S. Pat. No. 3,510,149 (Raidel), U.S. Pat. No. 3,762,487 (Bilas), U.S. Pat. No. 3,921,999 (Masser), U.S. Pat. No. 4,132,433 (Willetts), U.S. Pat. No. 4,136,893 (Sweet et al.), U.S. Pat. No. 4,256,326 (Cantrell et al.), U.S. Pat. No. 4,397,478 (Jensen et al.), U.S. Pat. No. 4,676,523 (Rogers), U.S. Pat. No. 4,741,553 (Raidel, II), U.S. Pat. No. 4,856,812 (Stephens et al.), U.S. Pat. No. 4,966,387 (White, IV), U.S. Pat. No. 5,234,067 (Simard), U.S. Pat. No. 5,375,871 (Mitchell et al.), U.S. Pat. No. 5,458,360 (Raidel, Sr.), U.S. Pat. No. 5,470,096 (Baxter), U.S. Pat. No. 5,615,906 (Raidel, Sr.), U.S. Pat. No. 6,062,579 (Fortier), and U.S. Pat. No. 6,129,369 (Dudding), which show various suspension systems illustrating the state of the art, some of which are particularly intended for use in tandem axle arrangements. However, such tandem axle arrangements are generally prone to unsatisfactory load distribution during operation which may lead to undesirable or unpleasant travelling conditions. In known tandem suspension systems, the front and rear suspensions are usually identical. In those that include a middle equalizer, the equalizer may have difficulty to stabilizing under different load conditions.

SUMMARY

An object of the invention is to provide a suspension assembly for supporting a chassis of a vehicle having a tandem axle arrangement, which allows to better distribute the load on the two axles.

Another object of the invention is to provide such a suspension assembly which is less hard on the transportation when the vehicle is in a no-load state.

Another object of the invention is to provide such a suspension assembly with an equalizer which stabilizes more easily under different loads.

Another object of the invention is to provide such a suspension assembly which can be adjusted according to different loads.

Another object of the invention is to provide such a suspension assembly which improves the traction of the vehicle under sandy or snowy conditions.

Another object of the invention is to provide such a suspension assembly which provides better comfort over long distance trucking and extends the lifetime of the vehicle.

According to the present invention, there is provided a load distributing tandem suspension assembly for supporting a chassis of a vehicle, comprising front and rear elongated spring arrangements connected to each other through an intermediate equalizer arrangement. The front spring arrangement includes a first spring element having front and rear ends, and a front axle attachment on the first spring element between the front and rear ends thereof. The front end of the first spring element is provided with a first mounting bracket for pivotal attachment to the chassis. The rear spring arrangement includes a second spring element having front and rear ends, a rear axle attachment on the second spring element at the rear end thereof, a shock absorber having an end attached to the rear end of the second spring element and an opposite end provided with a second mounting bracket for attachment to the chassis, and a guiding means for guiding the rear end of the second spring element up and down with respect to the chassis in a substantially straight course. The equalizer arrangement includes an equalizer support bracket having an upper end provided with a third mounting bracket for fixed attachment to the chassis between the front and rear spring arrangement, and an equalizer arm rockably mounted onto the equalizer support bracket about a transversal pivot. The equalizer arm has a front end pivotally receiving the rear end of the first spring element, and a rear end pivotally receiving the front end of the second spring element.

The way the suspension assembly is coupled to the vehicle along with the structure and effects of the shock absorber and the guiding means on the rear spring arrangement which interact with the front spring assembly through the equalizer arrangement causes a load distribution on the two tandem axles and provides smoother suspension.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 1:
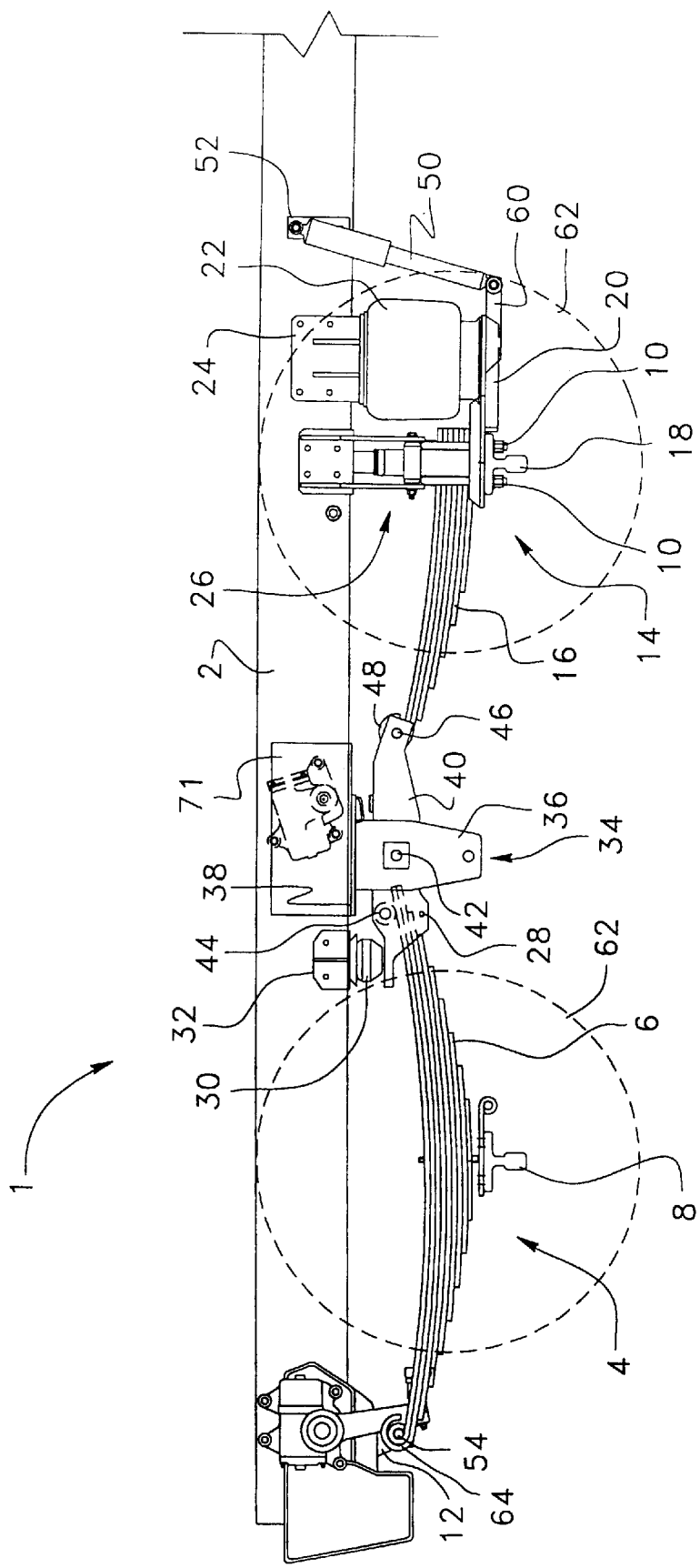
FIG. 1 is a side elevation partial view of the front part of a truck with a load distributing tandem suspension assembly according to the invention.
Figure 2:
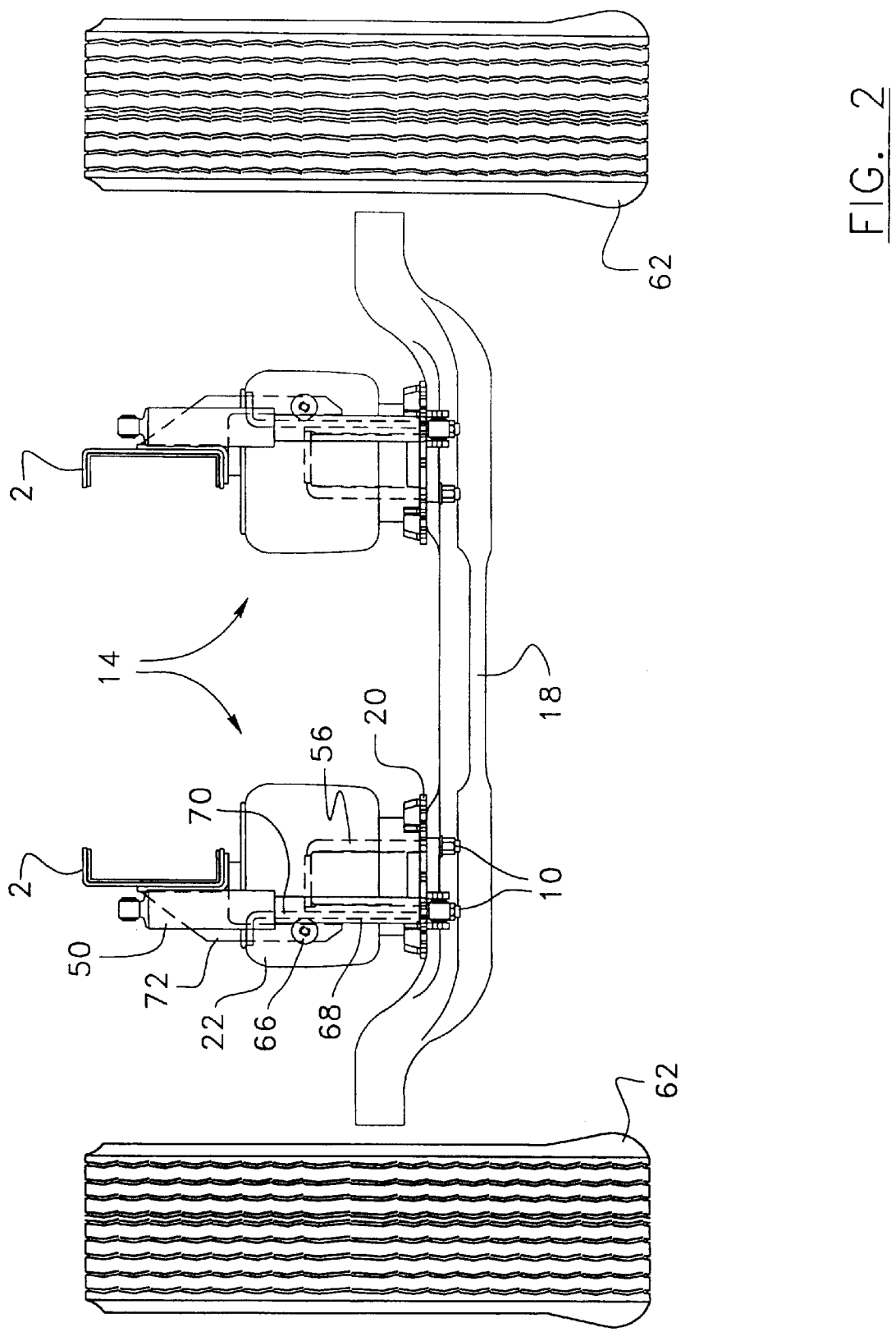
FIG. 2 is a rear elevation view of a rear spring arrangement according to the invention.
Figure 3:
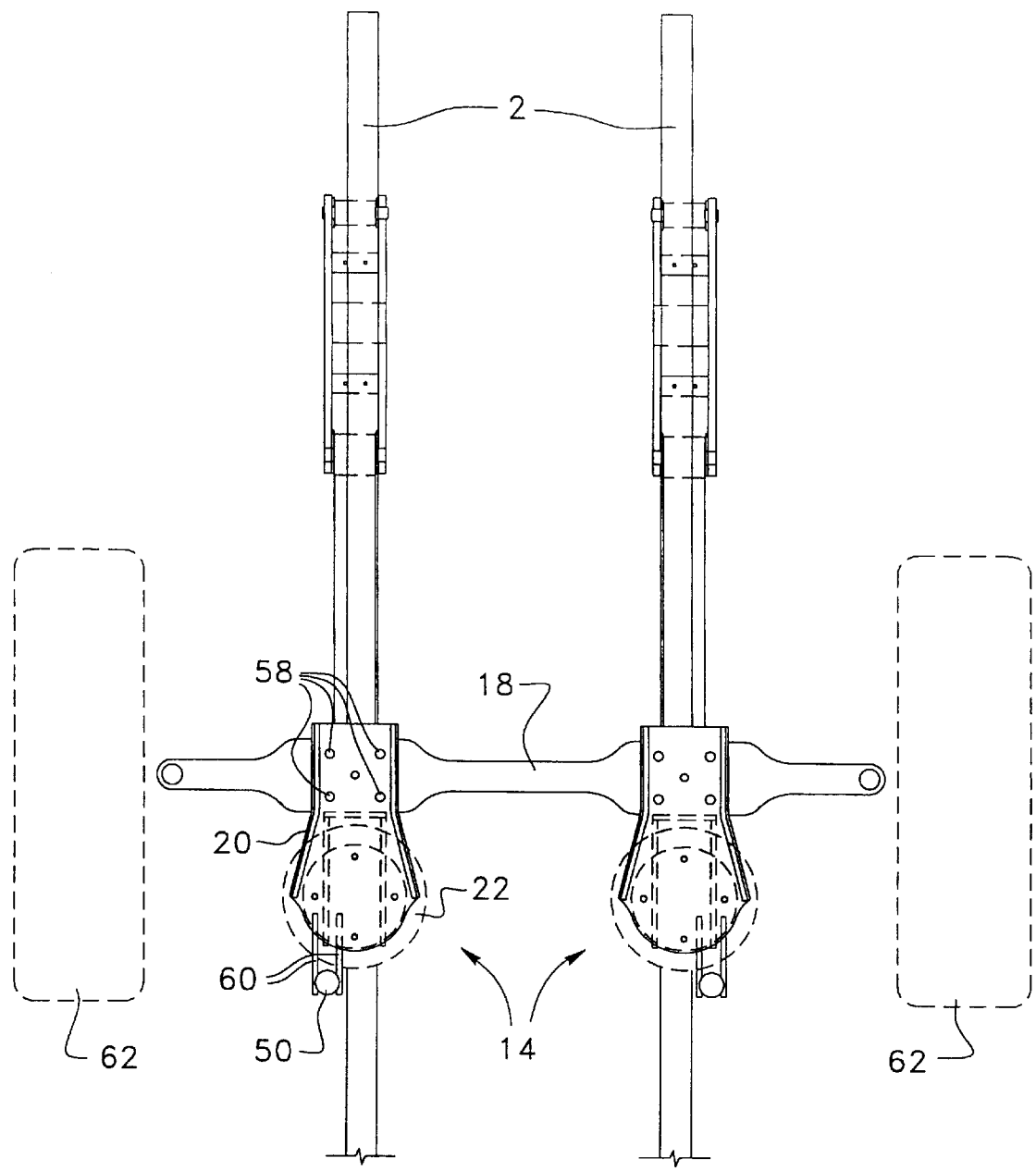
FIG. 3 is a top partial view of a rear spring arrangement according to the invention.

Referring to FIG. 1, there is shown the front part of a truck 1 provided with a load distributing tandem suspension assembly according to the invention, which supports the chassis 2 of the vehicle over wheels 62. As shown in FIGS. 2 and 3, both sides of the vehicle are equipped with such a suspension assembly. The tandem suspension assembly has a front elongated spring arrangement 4 which, except perhaps the way the front end of the spring element 6 is fixed to the chassis 2, i.e. without a shackle, is for the rest relatively similar to those found in conventional tandem suspensions with an equalizer. The spring element 6 is preferably formed of a leaf spring or an equivalent spring structure. Any suitable axle attachment, e.g. bolts and U-shaped brackets, can be used to attach the front axle 8 to the first spring element 6 between its front and rear ends, preferably at or near the longitudinal center of the spring element 6. The front end of the first spring element 6 is provided with a first mounting bracket 12 for pivotal attachment to the chassis 2, e.g. using a transverse pin 54 extending through a front eye 64 of the leaf spring 6.

The tandem suspension assembly also has a rear elongated spring arrangement 14 provided with a second spring element 16 which, in the illustrated case, is similar to the first spring element 6, i.e. a leaf spring, except that it has a truncated rear portion. Any suitable attachment can be used to attach the rear axle 18 to the second spring element 16 at or near its rear end, e.g. bolts 10 and U-shaped brackets 56 as shown in FIG. 2. A mounting base 20 is secured to and projects behind the second spring element 16, in order to provide a support surface for the mounting of a shock absorber 22 which, in the illustrated case, is formed of an air bag 22. To this effect, the mounting base 20 has a front end extending under and attached to the rear end of the second spring element 16, with the axle 18 extending under and being attached to the mounting base 20 using for example the bolts 10 passing across holes 58 in the mounting base 20 as shown in FIG. 3. Other fastening structures and elements can be used if desired.

The air bag 22 has a lower end attached to the mounting base 20 behind the second spring element 16 and an opposite upper end provided with a second mounting bracket 24 for attachment to the chassis 2, with the shock absorber 22 preferably centered right under it unless the available space requires another configuration, e.g. more outside or inside under the chassis 2. A guiding device 26 is used to guide the rear end of the second spring element 16 up and down with respect to the chassis 2 in a substantially straight course, i.e. vertically. In fact, the main purpose of the guiding device 26 is to limit as much as possible sideways motion of the rear spring assembly 26 and consequently the rear axle 18 under the vehicle which would subject the parts of the suspension to undesirable stress and awkward motion, especially in the case where the tandem suspension is used with steering axles. The guiding device 26 is preferably mounted right over the axle 18 or near that position. Nevertheless, it can also take other positions depending on the available space and needs. For example, it could be positioned through the air bag 22. In such a case, the air bag could possibly be also positioned right over the axle 18 instead of being mounted on the mounting base 20. No mounting base 20 would then be required. The guiding device 26 also acts to prevent the air bag 22 from collapsing laterally, which is inasmuch desirable when the suspension is used with steering axles.

Referring to FIG. 2, the guiding device 26 can be formed of a roller 66 extending in parallel with the second spring element 16 as best shown in FIG. 1, which roller 66 presses against a rolling surface 68 provided by a roller guiding member 70 (shown in dotted lines) upwardly projecting from the mounting base 20 or another suitable structural part of the rear spring assembly 14. A roller support 72 attached to the chassis 2 holds the roller 66 in place. Obviously, the positions of the roller 66 and the rolling surface 68 can be interchanged. Other kinds of guiding arrangements can be used, e.g. a telescopic arm (not illustrated). In the illustrated case, the combined action of two guiding devices 26 is required, on both sides of the chassis 2, as one prevents sideways motion only outwardly. Preferably, the roller guiding member 70 has an upper end which is outwardly bent to form a stop for, the roller 66 at a predetermined position along the course, thereby limiting the downward displacement of the rear spring arrangement 14 for example to an acceptable maximum extension for the air bag 22.

Referring back to FIG. 1, the tandem suspension assembly further has an equalizer arrangement 34 formed of an equalizer support bracket 36 having an upper end provided with a third mounting bracket 38 for fixed attachment to the chassis 2 between the front and rear spring arrangements 4, 14, possibly below a steering box 70. An equalizer arm 40 is rockably mounted onto the equalizer support bracket 36 about a transversal pivot 42. The equalizer arm 40 has a front end pivotally receiving the rear end of the first spring element 6, and a rear end pivotally receiving the front end of the second spring element 16. The pivotal connection of the spring element 6 with the equalizer arm 40 can be achieved through a transverse roller 44 pressing against a top side of the rear end of the leaf spring 6. A lower transverse pin 28 extending on a bottom side of the leaf spring 6 is preferably used to prevent the leaf spring 6 from falling out of the equalizer arm 40 for example when the front wheel 62 hangs above the ground. The pivotal connection of the spring element 16 with the equalizer arm 40 can be achieved using a transverse pin 46 extending through the front eye 48 of the leaf spring 16. Preferably, a bracket 32 provided with a rubber cushion 30 is mounted to the chassis 2 in front of the equalizer support 36 and above the front end of the equalizer arm 40 to exert a stopping pressure against the arm 40 and limit its upward course. Typically, the rubber cushion 30 can compress over approximately two inches. It can be made of other materials having other compression properties depending on the needs.

To assist the air bag 22 and dampen its oscillation, the rear spring arrangement 14 further has an additional shock absorber 50 extending behind the air bag 22, with its lower end pivotally connected to the mounting base 20 for example through a bracket 60 as best shown in FIG. 3, and its upper end provided with a mounting bracket 52 for pivotal attachment to the chassis 2 behind the mounting bracket 24.

In use, an ascending motion of the front axle 8 will exert a lifting action on the front end of the equalizer arm 40 and consequently a lowering action on the rear end of the equalizer arm 40, which will exert a straining action on the leaf spring. 16. The straining action will urge the leaf spring 16 to possibly stretch and the air bag 22 and the shock absorber 50 to work. The pressure in the air bag 22 can be controlled by means of a conventional pneumatic valve system (not illustrated in the Figures) connected to the air bag and responsive to a vertical displacement of the rear axle 18 for example to inflate the air bag 22 to increase the pressure when the axle 18 moves upwards and to deflate the air bag 22 to decrease the pressure when the axle 18 moves downwards.

Referring to FIGS. 2 and 3, there are shown a rear view and a top partial view of rear spring arrangements 14 according to the invention on respective sides of the chassis 2.

While embodiments of this invention have been illustrated in the accompanying drawings and described above, it will be evident to those skilled in the art that changes and modifications may be made therein without departing from the scope of this invention. All such modifications or variations are believed to be within the scope of the invention as defined by the claims appended hereto.

What is claimed is:

1. A load distributing tandem suspension assembly for supporting a chassis of a vehicle, comprising:

a front elongated spring arrangement including a first spring element having front and rear ends, and a front axle attachment on the first spring element between the front and rear ends thereof, the front end of the first spring element being provided with a first mounting bracket for pivotal attachment to the chassis;

a rear elongated spring arrangement including a second spring element having front and rear ends, a rear axle attachment on the second spring element at the rear end thereof, a shock absorber having an end attached to the rear end of the second spring element and an opposite end provided with a second mounting bracket for attachment to the chassis, and a guiding means for guiding the rear end of the second spring element up and down with respect to the chassis in a substantially straight course; and an equalizer arrangement including an equalizer support bracket having an upper end provided with a third mounting bracket for fixed attachment to the chassis between the front and rear spring arrangement, and an equalizer arm rockably mounted onto the equalizer support bracket about a transversal pivot, the equalizer arm having a front end pivotally receiving the rear end of the first spring element, and a rear end pivotally receiving the front end of the second spring element.

2. The load distributing tandem suspension assembly according to claim 1, wherein:

the rear spring arrangement comprises a mounting base secured to and projecting behind the second spring element; and the shock absorber comprises an air bag having a lower end mounted onto the mounting base and an opposite upper end fastened to the second mounting bracket.

3. The load distributing tandem suspension assembly according to claim 2, wherein the guiding means comprises a roller extending in parallel with the second spring element, a roller support for attachment of the roller to the chassis, and a roller guiding member associated with the rear spring arrangement and having a face providing a rolling surface extending on a side of the roller.

4. The load distributing tandem suspension assembly according to claim 3, wherein the roller guiding member has an upper end forming a stop for the roller at a predetermined position along the course.

5. The load distributing tandem suspension assembly according to claim 2, wherein the rear elongated spring arrangement further includes an additional shock absorber extending behind the air bag, the additional shock absorber having a lower end pivotally connected to the mounting base, and an upper end provided with a fourth mounting bracket for pivotal attachment to the chassis behind the second mounting bracket.

6. The load distributing tandem suspension assembly according to claim 5, wherein:

the first and second spring elements respectively comprise first and second leaf springs having front eyes;

the first mounting bracket comprises a transverse pin extending through the front eye of the first leaf spring;

the front end of the equalizer arm has a transverse roller pressing against a top side of a rear end of the first leaf spring; and the rear end of the equalizer arm has a transverse pin extending through the front eye of the second leaf spring.

7. The load distributing tandem suspension assembly according to claim 6, wherein the second leaf spring has a truncated rear portion with respect to the first leaf spring, the truncated rear portion being replaced by the shock absorbers and the mounting base.

8. The load distributing tandem suspension assembly according to claim 7, wherein the mounting base has a front end extending under and attached to the rear end of the second spring element, and a rear end provided with parallel arms between which the lower end of the additional shock absorber is pivotally mounted.

9. The load distributing tandem suspension assembly according to claim 7, wherein the front axle attachment is positioned substantially at a center of the first spring element, and the rear axle attachment is positioned substantially at the rear end of the second spring element.

10. The load distributing tandem suspension assembly according to claim 6, wherein the equalizer arrangement comprises a rubber cushion provided with a fifth mounting bracket for attachment to the chassis in front of the equalizer support bracket and above the front end of the equalizer arm to exert a stopping pressure thereagainst when the front end of the equalizer arm is driven upward, and a transverse pin spaced from the roller and extending on a bottom side of the rear end of the first leaf spring to prevent the rear end of the first leaf spring from falling out of the equalizer arm.

11. A tandem axle vehicle comprising:

a chassis;

front and rear tandem axles having opposite ends provided with wheels; and a pair of load distributing tandem suspension assemblies supporting the chassis on respective sides thereof and attaching the chassis to the tandem axles, each load distributing tandem suspension assembly comprising:

a front elongated spring arrangement including a first spring element having front and rear ends, a front axle attachment holding a corresponding one of the opposite ends of the front axle on the first spring element between the front and rear ends thereof, and a first mounting bracket pivotally attaching the front end of the first element to the chassis on a corresponding one of the sides thereof;

a rear elongated spring arrangement including a second spring element having front and rear ends, a rear axle attachment holding a corresponding one of the opposite ends of the rear axle on the second spring element at the rear end thereof, a shock absorber having an end attached to the rear end of the second spring element and an opposite end provided with a second mounting bracket attached to the chassis, and a guiding means for guiding the rear end of the second spring element up and down with respect to the chassis in a substantially straight course; and an equalizer arrangement including an equalizer support bracket having an upper end provided with a third mounting bracket fixedly attached to the chassis between the front and rear spring arrangements, and an equalizer arm rockably mounted onto the equalizer support bracket about a transversal pivot, the equalizer arm having a front end pivotally receiving the rear end of the first spring element and a rear end pivotally receiving the front end of the second spring element, the elongated spring and equalizer arrangements being aligned with one another.

12. The tandem axle vehicle according to claim 11, wherein:

each rear spring arrangement comprises a mounting base secured to and projecting behind the second spring element; and the shock absorber of each load distributing tandem suspension assembly comprises an air bag having a lower end mounted onto the mounting base and an opposite upper end fastened to the second mounting bracket.

13. The tandem axle vehicle according to claim 12, wherein the guiding means of each load distributing tandem suspension assembly comprises a roller extending in parallel with the second spring element, a roller support attaching the roller to the chassis, and a roller guiding member associated with the rear spring arrangement and having a face providing a rolling surface extending on a side of the roller.

14. The tandem axle vehicle according to claim 12, wherein the rear elongated spring arrangement of each load distributing tandem suspension assembly further includes an additional shock absorber extending behind the air bag, the additional shock absorber having a lower end pivotally connected to the mounting base, and an upper end provided with a fourth mounting bracket pivotally attached to the chassis behind the second mounting bracket.

15. The tandem axle vehicle according to claim 14, wherein:

the first and second spring elements respectively comprise first and second leaf springs having front eyes;

the first mounting brackets comprise transverse pins respectively extending through the front eyes of the first leaf springs;

the front ends of the equalizer arms respectively have transverse rollers pressing against top sides of rear ends of the first leaf springs; and the rear ends of the equalizer arms respectively have transverse pins extending through the front eyes of the second leaf springs.

16. The tandem axle vehicle according to claim 15, wherein the second leaf spring of each load distributing tandem suspension assembly has a truncated rear portion with respect to the first leaf spring, the truncated rear portion being respectively replaced by the shock absorbers and the mounting base.

17. The tandem axle vehicle according to claim 16, wherein the mounting base of each load distributing tandem suspension assembly has a front end extending under and attached to the rear end of the second spring element, and a rear end provided with parallel arms between which the lower end of the additional shock absorber is pivotally mounted.

18. The tandem axle vehicle according to claim 17, wherein the front axle attachments are positioned substantially at centers of the first spring elements, and the rear axle attachments are positioned substantially at the rear ends of the second spring elements.

19. The tandem axle vehicle according to claim 11, wherein the front and rear tandem axles are foremost steering axles of the tandem axle vehicle.

\* \* \* \* \*